(12) United States Patent
Kopf et al.

(10) Patent No.: US 7,025,508 B2
(45) Date of Patent: Apr. 11, 2006

(54) OPTICAL SHORT-CIRCUIT INSERT AND OPTICAL SHORT-CIRCUIT PLUG

(75) Inventors: Pia Kopf, Einhausen (DE); Joachim Hahn, Schmitten (DE); Rudolf Kunstmann, Wiesbaden (DE); Miquel Seidenfaden, Hofheim-Langenhain (DE)

(73) Assignees: Tyco Electronics AMP GmbH, Bensheim (DE); Schott AG, Mainz (DE)

( * ) Notice: Subject to any disclaimer, the term of this patent is extended or adjusted under 35 U.S.C. 154(b) by 0 days.

(21) Appl. No.: 10/651,137

(22) Filed: Aug. 28, 2003

(65) Prior Publication Data

US 2004/0081407 A1 Apr. 29, 2004

(30) Foreign Application Priority Data

Aug. 30, 2002 (DE) ............................. 102 39 924

(51) Int. Cl.
*G02B 6/36* (2006.01)
(52) U.S. Cl. ...................................... 385/77; 385/139
(58) Field of Classification Search .................. 385/77, 385/76, 140, 139; 439/282
See application file for complete search history.

(56) References Cited

U.S. PATENT DOCUMENTS

| | | | | |
|---|---|---|---|---|
| 4,418,983 A | * | 12/1983 | Bowen et al. ................. 385/69 |
| 4,832,720 A | * | 5/1989 | Watanabe et al. ............. 65/409 |
| 4,952,798 A | * | 8/1990 | Graham et al. ......... 250/227.11 |
| 4,982,083 A | | 1/1991 | Graham et al. ......... 250/227.11 |
| 5,039,456 A | * | 8/1991 | Bowen et al. ............. 264/1.25 |
| 5,076,688 A | | 12/1991 | Bowen et al. ............. 356/73.1 |
| 5,377,293 A | * | 12/1994 | Hatori et al. ................ 385/128 |
| 5,475,781 A | * | 12/1995 | Chang et al. ................. 385/76 |
| 5,792,233 A | * | 8/1998 | Chesnoy et al. ............. 65/408 |
| 5,892,615 A | * | 4/1999 | Grubb et al. .......... 359/341.31 |
| 5,898,813 A | * | 4/1999 | Beier ........................ 385/139 |
| 5,944,867 A | | 8/1999 | Chesnoy et al. |
| 6,179,639 B1 | * | 1/2001 | Kuwahara et al. .......... 439/282 |
| 6,259,830 B1 | * | 7/2001 | Bhagavatula .................. 385/2 |
| 6,336,821 B1 | * | 1/2002 | Hattori ....................... 439/282 |
| 6,394,830 B1 | * | 5/2002 | Huang ........................ 439/282 |
| 6,454,464 B1 | * | 9/2002 | Nolan ......................... 385/60 |
| 6,558,180 B1 | * | 5/2003 | Nishimoto .................. 439/282 |
| 6,611,648 B1 | * | 8/2003 | Kumar et al. ............... 385/126 |
| 6,634,798 B1 | * | 10/2003 | Cheng ......................... 385/76 |
| 6,707,979 B1 | * | 3/2004 | Wang et al. ................. 385/140 |
| 2003/0032321 A1 | * | 2/2003 | Wertz et al. ................ 439/282 |

FOREIGN PATENT DOCUMENTS

| DE | 29 39 231 A1 | 4/1981 |
|---|---|---|
| DE | 35 44 137 A1 | 12/1985 |
| DE | 3544137 A1 | 6/1987 |

(Continued)

*Primary Examiner*—Hae Moon Hyeon
(74) *Attorney, Agent, or Firm*—Barley Snyder LLC

(57) ABSTRACT

The invention provides an optical short-circuit insert for accommodation in a plug housing, with a plug region with two mutually parallel optical fiber ends of an optical fiber portion. A curved region of the optical fiber portion, intermediate optical fiber ends, is guided in an arc of 180 degrees. The optical fiber portion has a curved portion of a fiber consisting of multi-component glass with cladding or of a multi-conductor glass fiber with cladding, which is enveloped in a plastic carrier. An optical short-circuit plug with a plug housing enveloping a plug and a short-circuit insert capable of being pushed into it is also provided.

18 Claims, 5 Drawing Sheets

FOREIGN PATENT DOCUMENTS

| DE | 4428855 A1 | 2/1996 |
| DE | 19951257 A1 | 4/2001 |
| EP | 1 096 283 A2 | 10/2000 |
| EP | 1 130 436 A1 | 3/2001 |

* cited by examiner

FIG. 1A
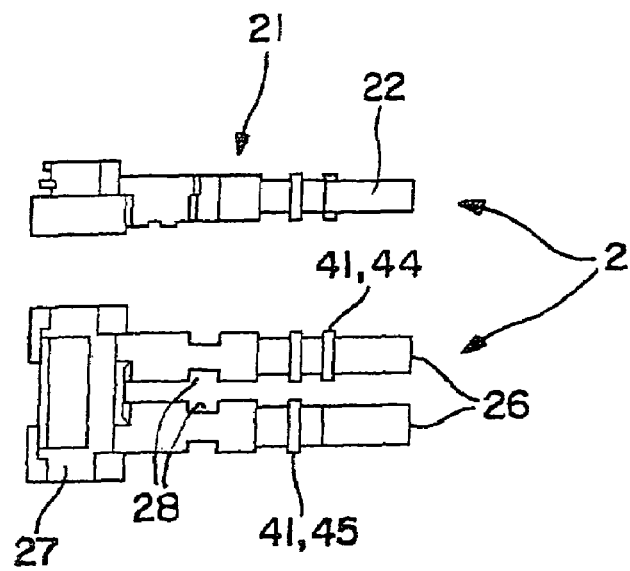
FIG. 1B
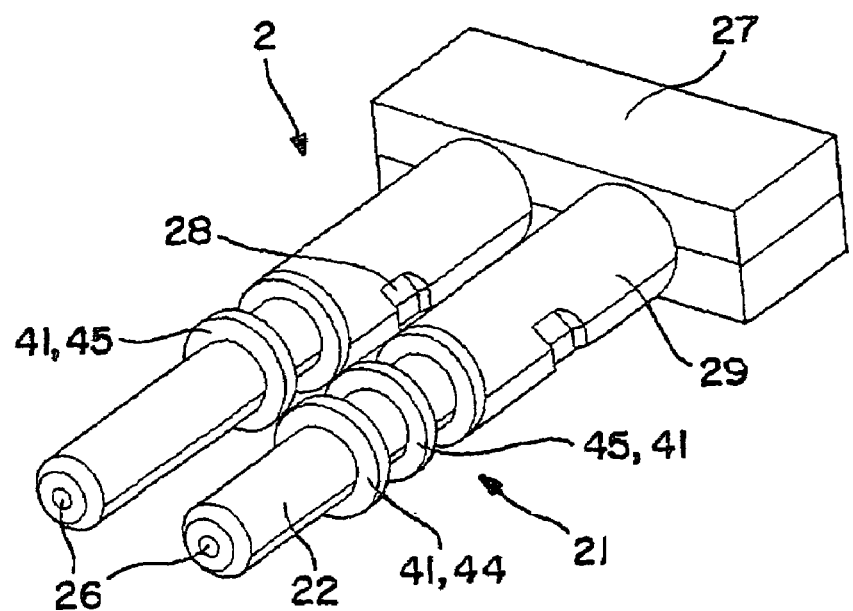
FIG. 2

OPTICAL SHORT-CIRCUIT INSERT AND OPTICAL SHORT-CIRCUIT PLUG

FIELD OF THE INVENTION

The present invention relates to a short-circuit insert and a short-circuit plug, and more particularly to a short circuit apparatus for a diagnostics interface or a device place-holder in an optical database system.

BACKGROUND OF THE INVENTION

Bus systems are increasingly used in place of wiring harnesses for connecting different components or devices, respectively in a motor vehicle. A plurality of components are typically coupled to one another in what is known as a ring bus. The individual components connected to one another in ring form exchange their data with one another via wire conductors or optical fibers. A diagnostics interface is provided in a typical ring bus to allow routine tests to be carried out, such as to check the functions of the components as well as to search for a defective component in an optical ring bus. During normal operation a bridging plug is inserted in this interface to bridge or short-circuit the interface and, thereby complete the ring of the ring bus. The bridging plug is removed for diagnostic purposes, making the diagnostics interface accessible for coupling to a diagnostic or test device.

Generic optical short-circuit plugs are described for example in DE 35 44 137 A1, in U.S. Pat. No. 4,982,083 A and in U.S. Pat. No. 5,076,688 A. An optical short-circuit plug provided in DE 44 28 855 A1 for short-circuiting two optical units contains a short-circuit optical fiber whose ends are each received by a contact pin for coupling to the optical units. The contact pins are provided as separate elements and are enveloped in a sleeve of elastic material. The sleeve deforms during pin mounting to generate a defined application force and for tolerance compensation.

Finally an optical connector plug is provided by DE 199 51 257 A1 for bridging an open or non-assigned or interrupted plug connection in an optical bus system. The optical connector plug has a plug housing with a plug region by means of which the connector plug can be plugged onto the plug end. A groove is molded into the plug housing into which groove an optical fiber with attached fiber end sleeves is laid.

However, a need still exists for a compact optical short-circuit insert and a corresponding short-circuit plug. This object is achieved by the present invention, as will be described hereafter.

SUMMARY

The diagnostics interface of an optical databus system is typically arranged within a ring structure. It has a device plug with two open optical fiber ends. These fiber ends are connected to a short-circuit plug for normal operation of the optical bus system according to an embodiment of the invention. The fiber ends are alternatively connected to a diagnostics plug of a diagnostic or test device for checking the optical databus system. The additional optical coupling position (diagnostics interface) for connecting a diagnostic or test device inside the optical ring structure allows rapid diagnosis of all components wired to one another in the ring structure and of the optical fiber of the ring structure itself, without requiring a component to be physically separated from the databus. In the operational state of the databus system (normal operation), the short-circuit plug is plugged-in to the optical coupling position to close the ring structure. The short-circuit plug is manually separable.

An examplary optical short-circuit plug, according to the invention, has an optical fiber portion curved through an arc of 180 degrees inside a plastic housing. The optical fiber is molded in an open U-shape with two legs running parallel to one another. It is important that the damping of the ring bus does not increase significantly when the short-circuit plug is introduced.

Depending on the structure of the optical ring bus, a multi-component glass may be suitable for the optical fiber. The multi-component glass is plastically deformed under the application of heat and formed into the desired 180-degree bend. Alternatively, a multicore glass fiber can be used which consists of a combined fiber bundle. It is important for the optical fiber to have cladding, (e.g., an external layer or external sheath consisting of a glass which has a lower refractive index than the core). For a multicore glass fiber, each individual fiber of the fiber bundle is provided with a sheath or a sheath layer. An optical fiber having glass with cladding requires a minimum bending radius of approximately 2 mm. The reflective properties within the optical fiber are impaired if the radii are smaller than this minimum bend radius. An optical short-circuit plug with a bending radius of less than 5 mm is relatively compact and can therefore be accommodated without problems in almost any desired position, for example in a motor vehicle.

BRIEF DESCRIPTION OF THE DRAWINGS

The invention will now be described by way of example with reference to the accompanying figures of which:

FIG. 1A shows a side view of a short-circuit insert according to an embodiment of the invention, FIG. 1B shows a plan view of the short-circuit insert of FIG. 1A, FIG. 2 shows a perspective view of the short-circuit insert of FIGS. 1A and 1B.

DETAILED DESCRIPTION

Figure 4:
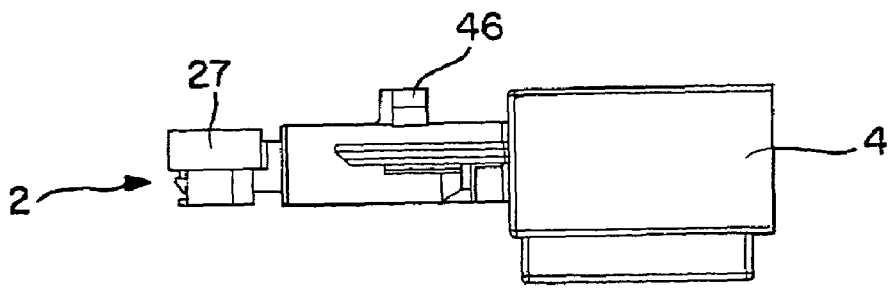
FIGS. 4 and 5 are a side view and plan view, respectively of a short-circuit plug with a short-circuit insert pushed into a housing enveloping a plug according to an embodiment of the invention.

A short-circuit insert 2 according to an exemplary embodiment of the invention is shown in FIGS. 1 and 2. The short-circuit insert 2 has a rectangular head region 27 with two plug pillars 22 protruding out of it vertically to form a plug region 21. The plug pillars 22 each have a substantially cylindrical contour and taper from a diameter which is slightly smaller than a height of the head region 27 to a smaller diameter with respectively one or two raised latching rings 44, 45, wherein the first latching ring 44 provides a latching seat or shoulder 41 for latching the short-circuit insert in a plug recess of a corresponding plug housing 4 as shown in FIG. 4. Optical fiber ends 26 are positioned at the end faces of the plug pillars 22. Optical fiber ends 26 interact with corresponding counter-surfaces in the plug housing 4 to allow signal coupling or signal uncoupling respectively.

Primary securing of the short-circuit insert in the housing enveloping a plug 4 is provided by first latching ring 44 at the right-hand plug pillar 22 (shown in FIG. 2), which latching ring 44 can easily latch into a corresponding groove in the receiving region of the corresponding housing enveloping a plug. Secondary securing comprises second latching rings 45 which are positioned at the same height on both plug pillars 22. The first latching ring 44 is provided for securing the short-circuit insert 2 against falling out of the plug housing 4, but does not prevent the short-circuit insert 2 being pulled out of the plug housing 4.

Figure 8:
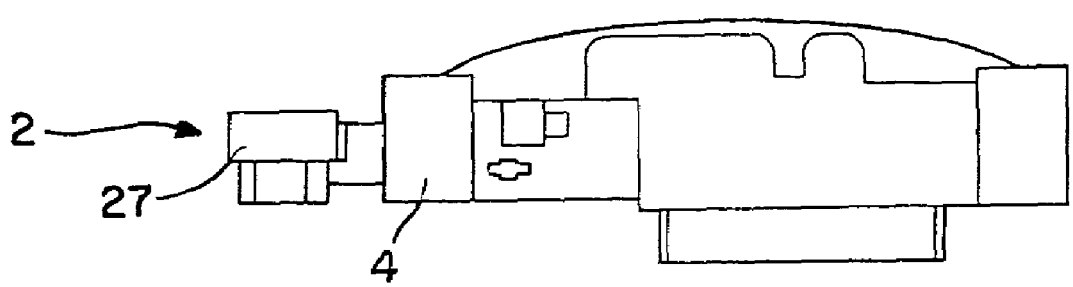
FIGS. 8 to 10 are a side view, a plan view and a perspective view, respectively showing a short-circuit insert connected to an intermediate element.
Figure 9:
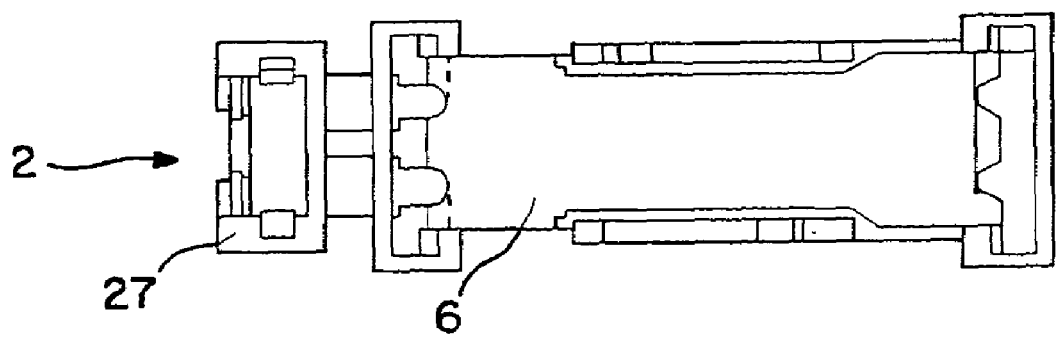
Figure 10:
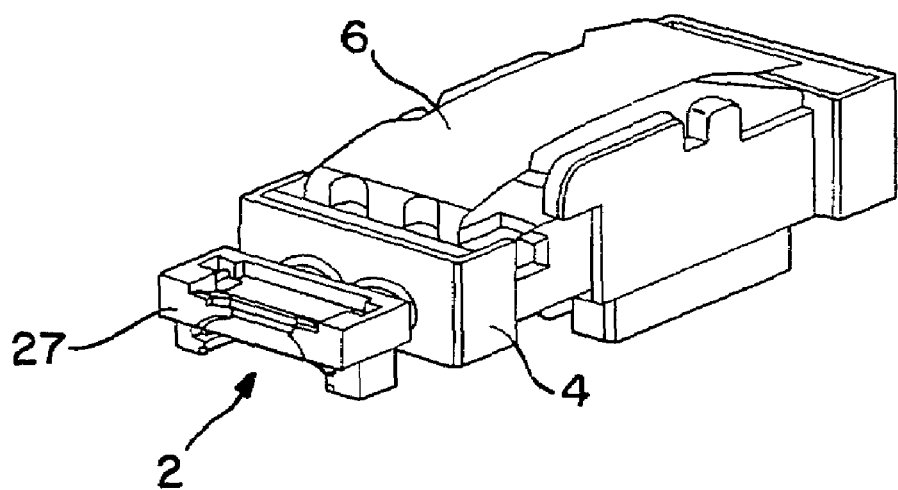

The short-circuit insert 2 is prevented from being pulled out by a secondary securing means. In FIGS. 4, 5, 6, 11, 12 and 13, the second latching rings 45 grip the plug housing 4 to provide secondary securing. In FIGS. 8, 9 and 10, grooves 28 provide secondary securing.

Figure 5:
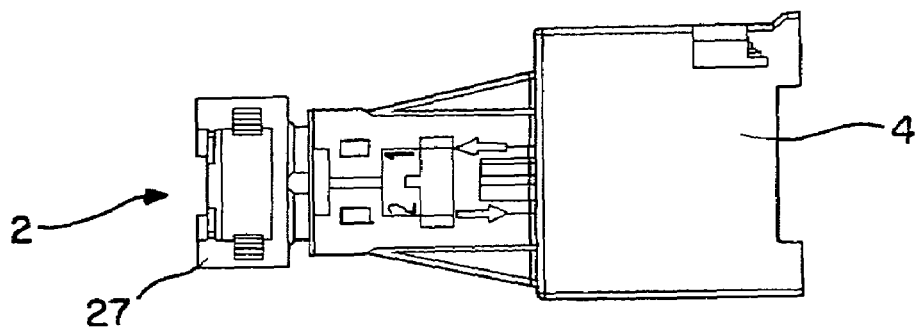
Figure 6:
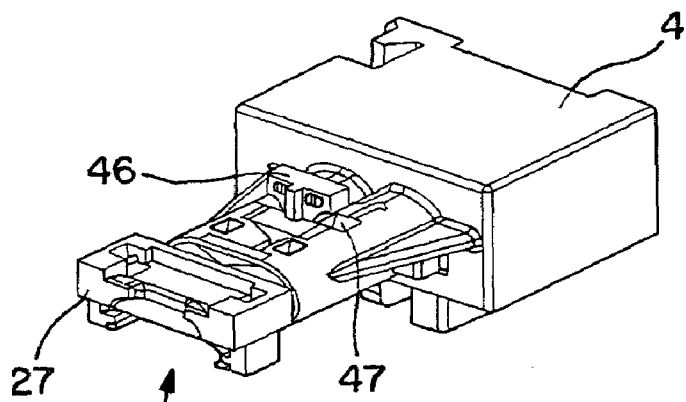
FIG. 6 shows a perspective view of the short-circuit insert pushed into the housing enveloping the plug.
Figure 7:
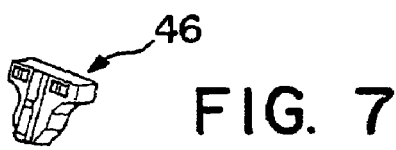
FIG. 7 is a perspective view of the short-circuit plug of FIGS. 4, 5, and 6 showing a latch insert for securing the short-circuit insert in the housing enveloping the plug.

In an exemplary embodiment of the invention, as shown in FIGS. 4, 5, 6, 11, 12 and 13, secondary securing is provided by interaction between second latching rings 45 and a latch insert 46 (shown in FIGS. 4 and 6). Latch insert 46 is pushed into a receptacle 47 (shown in FIG. 6) in the plug housing 4. When the short-circuit insert 2 is inserted into the plug housing 4, the latch insert 46 engages behind the second latching rings 45 to prevent pulling the short-circuit insert 2 out of the plug housing 4.

In an alternative exemplary embodiment of the invention, as shown in FIGS. 8, 9 and 10, secondary securing is provided by interaction between the grooves 28 and a metal spring 6 pushed over the plug housing 4. When the short-circuit insert 2 is pushed into the plug housing, the spring 6 engages with the grooves 28 to prevent short-circuit insert 2 from being pulled out of the plug housing 4.

Referring again to FIGS. 4 through 7, a short-circuit insert 2 is shown pushed into a plug housing 4. Secondary securing of the short-circuit insert 2 is provided by the latch insert 46 when it is pushed into the intended receptacle 47. Prior to fully pushing the latch insert 46 into the receptacle 47, the latch insert is slidingly aligned with the receptacle 47. In FIGS. 4 through 6, the latch insert is not fully pushed into the receptacle 47. In the fully pushed-in state, the latch insert 46 can dip into the receptacle 47 until flush with it.

The plug housing 4 of FIGS. 4 to 6 with the short-circuit insert 2 installed forms the counter-piece (i.e., substitute) to a diagnostics plug of a diagnostic device (not shown). For this purpose, the plug housing 4 has a plug recess. With the diagnostic plug (not shown) of a ring bus (not shown) plugged-in to the plug recess of the plug housing 4, a largely damping-free signal transmission is possible from the optical fiber ends 26 to the optical fiber ends (not shown) of the diagnostics plug.

Figure 3:
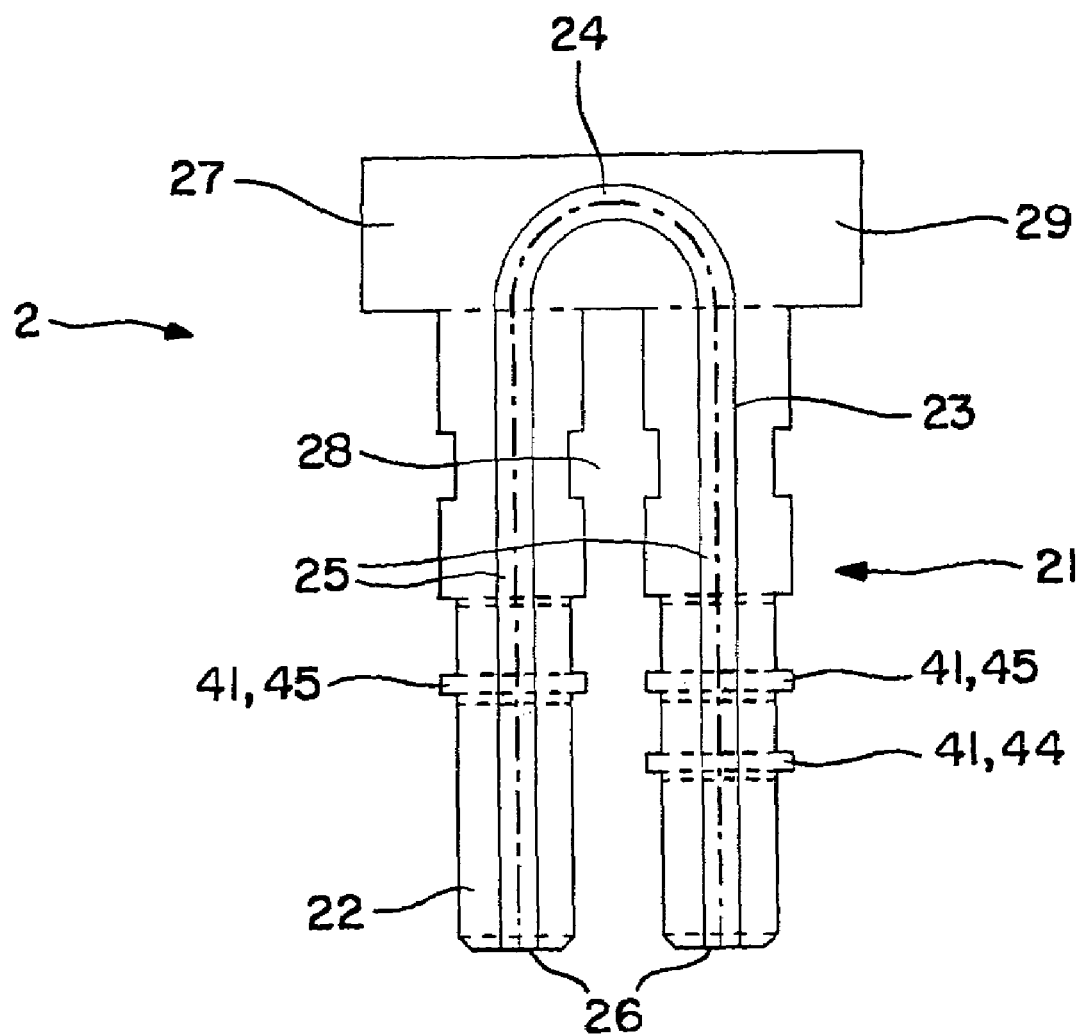
FIG. 3 is a sectional plan view of the short-circuit insert of FIGS. 1A, 1B, and 2 showing an optical fiber embedded in a carrier element of the short-circuit insert.

FIG. 3 shows the short-circuit insert 2 which has a curved optical fiber portion 23 inside a carrier element 29. This optical fiber portion 23 runs inside the plug pillars 22 in straight portions 25 respectively, which are joined by an arc portion 24 located inside the head region 27 of the plug insert 2. The arc portion 24 describes a bend of 180 degrees such that the optical fiber ends 26 of the straight portions 25 are disposed parallel to one another.

The carrier element 29 of the short-circuit insert 2 can, for example, consist of injection-molded plastic into which the optical fiber portion 23 is molded. Alternatively, the carrier element 29 can consist of two plastic housing halves which are bonded to one another or interlocked after insertion of the optical fiber portion 23.

The optical fiber portion 23 may, for example, consist of multi-component glass with cladding which previously was brought into the desired shape by means of heat, so that it is held free of stress in the carrier element 29. Alternatively, a multi-conductor glass fiber (what is known as a multicore glass fiber) can be formed into the optical fiber portion 23. The multi-conductor glass comprises a large number of fine single fibers being mechanically combined to form a fiber bundle. Which of these embodiments of the fiber portion 23 is used depends upon the desired application (i.e., the structure of the ring bus being short-circuited. The cladding serves to produce different refractive indices between the core and the sheath of the optical fiber so as to reduce the damping of transmitted signals due to undesired uncouplings.

The dimensions of optical fiber portion 23 must provide optical coupling without significantly increasing damping. It is highly desirable to provide a small envelope to accommodate various applications in which space is limited. The inventors have determined that these goals can be achieved by controlling certain dimensions in the short-circuit insert 2. In an exemplary embodiment, the thickness of the optical fiber is about 1 mm, and the center distance between the optical fiber ends 26 is about. 6 mm. The total length of the short-circuit insert 2 is about 25 mm with the head region 27 having a length and width, each of about. 5 mm. A typical diameter of the plug pillars 22 in the lower plug region 21 is about 3 mm. In the upper region, the plug pillars 22 can have a diameter approximately equivalent to the width of the head region 27 (approx. 5 mm). The resultant bending radius of the arc portion 24 of the optical fiber portion 23 in the head region 27 is a dimension of about 3 mm. With this bending radius, no significant signal damping will occur due to uncoupled light.

A preferred refractive index of the cladding glass is about 1.6. A preferred refractive index of the core glass is about 1.5. The diameters of the single fibers in a multicore optical fiber are preferably between about 30 and 70 μm and more preferably about 50 μm. The thickness of the cladding is preferably about. 3 μm. Signal damping in an optical fiber curved through 180 degrees which is built into a plug according to the invention is preferably less than 4 dB.

An alternative connection of the short-circuit insert 2 with a plug housing 4 is illustrated by reference to FIGS. 8 through 10. Such a connection is primarily intended for making a connection between conductors. An intermediate element can be pushed into the plug housing 4, in which intermediate element corresponding optical fiber ends (not shown) are embedded. These fiber ends are optically connected to the optical end surfaces 28 of the short-circuit insert 2.

Figure 11:
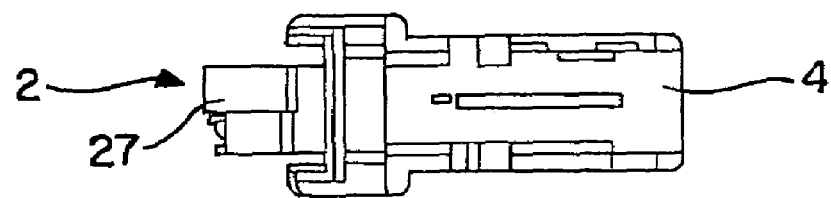
FIGS. 11 to 13 are a side view, a plan view and a perspective view, respectively showing a short-circuit insert pushed into an alternative housing enveloping a plug according to another embodiment of the invention.
Figure 12:
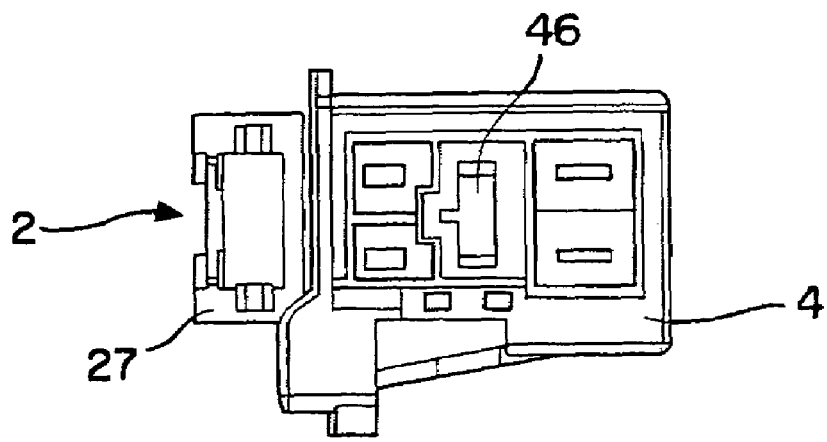
Figure 13:
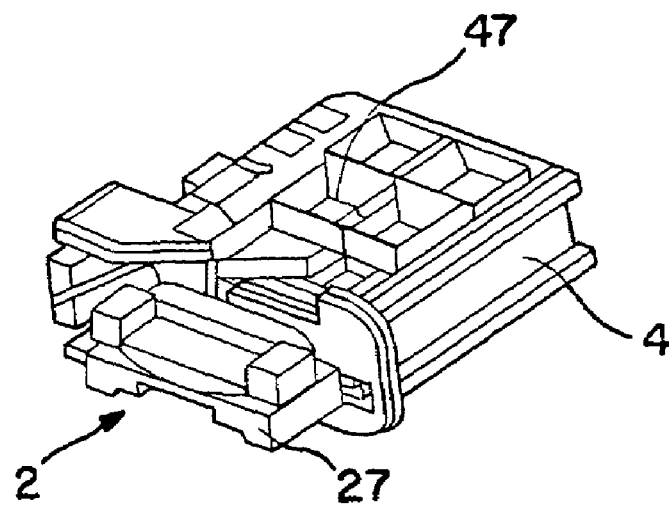

FIGS. 11 to 13 show an inserted short-circuit insert 2 in an alternative embodiment of plug housing 4. The plug side here is capable of connection to a female connector and serves as a device place-holder. In this embodiment, the secondary securing is provided by the latch insert 46 which is insertable into the receptacle 47. The plug housing 4 shown in these figures is preferably intended for recessed mounting.

We claim:

1. An optical short-circuit insert, being receivable in a plug housing and comprising:
   a plug region; and
   an optical fiber portion having two mutually parallel optical fiber ends positioned within the plug region, the optical fiber portion has a curved portion being formed in an arc of substantially 180 degrees and is formed of a multi-component glass core with cladding or a multi-core glass fiber with cladding enveloped in a plastic carrier, the plastic carrier completely envelops the optical fiber except for the optical end surfaces and has one or more shoulders for primary securing and secondary securing of the short-circuit insert in the plug housing.

2. The optical short-circuit insert according to claim 1 wherein the mutually parallel, straight portions of the optical fiber portion have a center distance of less than 10 mm, and the optical fiber portion provides a signal damping of less than 4 dB.

3. The optical short-circuit insert according to claim 1 wherein the mutually parallel, straight portions of the optical fiber portion have a center distance of about 6 mm, and the optical fiber portion provides a signal damping of less than 4 dB.

4. The optical short-circuit insert according to claim 2 wherein the optical fiber portion comprises a multi-component glass having a thickness of about 1 mm.

5. The optical short-circuit insert according to claim 2 wherein the optical fiber portion comprises a multi-conductor glass fiber having a thickness of about 1 mm.

6. The optical short-circuit insert according to claim 1 wherein the optical fiber portion comprises a multi-core glass fiber with cladding on each core.

7. The optical short-circuit insert according to claim 2 wherein the refractive index of the cladding is about 1.6, the refractive index of the core is about 1.5.

8. The optical short-circuit insert according to claim 2 wherein the core has a diameter of between about 30 and 70 µm and the cladding has a thickness of about 3 µm.

9. The optical short-circuit insert according to claim 2 wherein the core has a diameter of about 50 µm and the cladding has a thickness of about 3 µm.

10. The optical short-circuit insert according to claim 1, wherein the secondary securing further comprises a latch insert engaging behind a secondary one of the one or more shoulders.

11. The optical short-circuit plug assembly according to claim 10, wherein the secondary securing mechanism comprises a second latching ring for engaging a latch insert which is slidingly received into engagement with the second lathing ring.

12. An optical short-circuit plug assembly comprising:
   a plug housing enveloping a plug;
   a short-circuit insert received in the plug housing, the short-circuit insert being configured for accommodation in the plug housing, the short-circuit insert having a plug region with two mutually parallel optical fiber ends of an optical fiber portion in which the optical fiber portion has a curved portion guided in an arc of substantially 180 degrees and comprises a multi-component glass core with cladding or a multi-core glass fiber with cladding enveloped in a plastic carrier wherein the short circuit insert has a primary securing mechanism and a secondary securing mechanism for securing the short-circuit insert in the plug housing.

13. The optical short-circuit plug assembly according to claim 12 wherein the plug housing has latching means for securing the optical short-circuit plug with a complementary plug connector.

14. The optical short-circuit plug assembly according to claim 12 wherein the plug housing is a socket connector.

15. The optical short-circuit plug assembly according to claim 12 wherein the plug housing is capable of being brought into a socket connector.

16. The optical short-circuit plug assembly according to claim 12, wherein the primary securing mechanism comprises a first latching ring being receivable in a corresponding grove in a receiving region of a housing.

17. A short-circuit insert for closing the ring of an optical data bus, the insert comprising:
   a housing having two straight pillars interconnected by a head region,
   first and second latching rings located on each of the pillars for receiving a latch insert; and
   an optical fiber disposed in the housing with two mutually parallel optical fiber ends disposed in the pillars and having end surfaces exposed at corresponding ends of the pillars, the optical fiber having a curved portion disposed in the head region and guided in an arc of substantially 180 degrees with a bend radius of less than 5 mm;
   wherein the fiber comprises a multi-component glass core with cladding or a multi-core glass fiber with cladding.

18. The short-circuit insert of claim 17, wherein the housing comprises two halves that are joined around the optical fiber.

* * * * *